United States Patent
Kunzmann et al.

(10) Patent No.: US 11,381,937 B2
(45) Date of Patent: Jul. 5, 2022

(54) ASSET TRACKING DEVICE, ASSET AND A METHOD OF DETERMINING WHETHER AN ASSET TRACKING DEVICE IS TRANSPORTED BY A PREDETERMINED TYPE OF TRANSPORTATION MEANS

(71) Applicant: ALPS ALPINE CO., LTD., Tokyo (JP)

(72) Inventors: Sascha Kunzmann, Schwabsoien (DE); Mathias Bachmayer, Oberschleissheim (DE)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/288,176

(22) PCT Filed: Oct. 18, 2019

(86) PCT No.: PCT/EP2019/078367
§ 371 (c)(1),
(2) Date: Apr. 23, 2021

(87) PCT Pub. No.: WO2020/083776
PCT Pub. Date: Apr. 30, 2020

(65) Prior Publication Data
US 2021/0385620 A1  Dec. 9, 2021

(30) Foreign Application Priority Data
Oct. 24, 2018 (EP) .................. 18202422

(51) Int. Cl.
*H04W 4/029* (2018.01)
*G01P 15/18* (2013.01)
(Continued)

(52) U.S. Cl.
CPC ............ *H04W 4/029* (2018.02); *G01P 15/18* (2013.01); *G06Q 50/28* (2013.01); *G07C 5/008* (2013.01); *H04W 4/027* (2013.01)

(58) Field of Classification Search
CPC ....... H04W 4/029; H04W 4/027; G01P 15/18; G06Q 50/28; G06Q 10/0833; G07C 5/008
(Continued)

(56) References Cited

U.S. PATENT DOCUMENTS 10,477,600 B1 * 11/2019 Willis ................... H04W 76/11
10,957,204 B1 *  3/2021 Kumar .................... G08G 1/20
(Continued)

OTHER PUBLICATIONS

International Search Report for PCT/EP2019/078367 dated Jan. 13, 2020.
European Search Report for EP18202422.4 dated Mar. 14, 2019.

*Primary Examiner* — Hirdepal Singh
(74) *Attorney, Agent, or Firm* — IPUSA, PLLC (57) ABSTRACT

With respect to an asset tracking device for determining whether a transport by a predetermined type of transportation has started, the asset tracking device includes an acceleration sensor configured to measure an acceleration experienced by the asset tracking device, a controller configured to analyze data measured by the acceleration sensor, and a transmitter. The controller is configured to determine from the data measured by the acceleration sensor whether the asset tracking device is transported by a predetermined type of transportation. The controller is configured to cause the transmitter to transmit a signal that a transport of the asset tracking device with the predetermined type of transportation has started, when the controller has determined from the data measured by the acceleration sensor that the asset tracking device is transported by the predetermined type of transportation.

15 Claims, 5 Drawing Sheets

(51) Int. Cl.
*G06Q 50/28* (2012.01)
*G07C 5/00* (2006.01)
*H04W 4/02* (2018.01)

(58) Field of Classification Search
USPC .................................................. 455/456.1
See application file for complete search history.

(56) References Cited

U.S. PATENT DOCUMENTS

| | | | |
|---|---|---|---|
| 2002/0177476 A1* | 11/2002 | Chou | G01S 5/0027 |
| | | | 455/574 |
| 2008/0258970 A1* | 10/2008 | Berlin | G01D 9/005 |
| | | | 342/357.75 |
| 2010/0097208 A1* | 4/2010 | Rosing | G06Q 10/087 |
| | | | 340/572.1 |
| 2013/0066548 A1* | 3/2013 | Gruen | G01C 21/3617 |
| | | | 701/410 |
| 2014/0278044 A1* | 9/2014 | Jacobs | G08G 1/096844 |
| | | | 701/300 |
| 2018/0039941 A1* | 2/2018 | Kamir | H04W 4/023 |

* cited by examiner

2D - Fingerprint

Fig. 7

ASSET TRACKING DEVICE, ASSET AND A METHOD OF DETERMINING WHETHER AN ASSET TRACKING DEVICE IS TRANSPORTED BY A PREDETERMINED TYPE OF TRANSPORTATION MEANS

FIELD OF THE INVENTION

The present invention relates to tracking of low-cost assets. In particular, the present invention relates to an asset tracking device, an asset, preferably a container or a load carrier or a box, with an asset tracking device and a method of transmitting data representative of a new geographical position of an asset tracking device.

BACKGROUND OF THE INVENTION

To date the active tracking of a vast majority of individual low-cost, typically non-powered assets especially in the land, air, and sea logistics as well as production logistics has not been possible due to extremely high investments and operating cost.

The real breakthrough for asset location tracking has not been accomplished yet. Parts of these high investments are on the reader/receiver infrastructure side. This may entail RFID readers, short-range communication end-devices or long-range communication gateways or base stations with high monthly provider/cell-roaming or international roaming cost. On the device side typically the short-range pairing effort to end-user devices/gateways provide an uneconomical effort for extremely high volumes of assets, and continuous motion sensing and real-time data communication prohibit the use of affordable and small-integration size of energy sources.

SUMMARY OF THE INVENTION

There may thus be a need to provide for an improved tracking of assets.

The object of the present invention is solved by the subject-matter of the independent claims. Further embodiments and advantages of the invention are incorporated in the dependent claims.

The described embodiments similarly pertain to the asset tracking device, the asset with an asset tracking device and the method of determining whether an asset tracking device is transported by a predetermined type of transportation means. Synergetic effects may arise from different combinations of the embodiments although they might not be described in detail.

Technical terms are used by their common sense. If a specific meaning is conveyed to certain terms, definitions of terms will be given in the following in the context of which the terms are used. In particular, an asset may be understood as a container, load carrier, box or trolley.

According to a first aspect of the present invention, an asset tracking device for determining whether a transport by a predetermined type of transportation means has started is presented. The device comprises an acceleration sensor for measuring an acceleration experienced by the asset tracking device, a controller configured for analyzing data measured by the acceleration sensor, and a transmitter. The controller is configured for determining from the data measured by the acceleration sensor whether the asset tracking device is transported by a predetermined type of transportation means, and the controller is configured for causing the transmitter to transmit a signal that a transport of the asset tracking device with the predetermined type of transportation means has started, when the controller determined from the data measured by the acceleration sensor that the asset tracking device is transported by the predetermined type of transportation means.

One of the beneficial results of this asset tracking device (hereinafter also referred to as "the tracker") is a maximum of device lifetime based on its energy capacity due to a minimum of messages transmitted/communicated only if the asset has clearly been relocated with the type of transportation means, for which the user consider it as a "valid relocation". Thus, the user can preselect, i.e. predetermine, which type of transportation means shall trigger the emission/transmission of said signal. By defining which type of transportation means is indicative for a "valid relocation" in the controller of the presented tracker, the user can individually design the tracker to send only the signal if said type of transportation means is detected to currently transport this tracker. This will be explained in more detail hereinafter.

Acceleration data being characteristic for a kind of transportation means, like e.g. a truck or a fork lifter, can be stored within the tracker, such that the tracker can do the determination of the kind of transportation means without any further data or energy access to the outside of the tracker or to any other device or network.

In the context of the present invention, "asset tracking" shall refer to the method of tracking physical assets, i.e. physical objects, like e.g. logistics objects like e.g. logistics containers, in which goods, products, equipment and the like are transported via vehicles from destination A to B via e.g. several different logistic centers. In such a context, micro movements (and the corresponding location change) such as moving a logistics container from stock X to stock Y in one and the same logistic center are often not of interest. Only huge relocations, entailing a significant distance that the asset/object needs to be moved and entailing a significant velocity of movement of the asset/object, may sometimes be of interest.

It should also be mentioned that "tracking" in the context of the present invention shall not be necessarily understood as recording a continuous geographical track of an asset/object. In particular, in embodiments this may be the case, but it is not an necessary feature of the present invention. Rather, "tracking" shall be understood in such a way that the present invention facilitates and allows for determining whether the asset tracking device is transported by a predetermined type of transportation means, i.e. a "valid relocation". This may be the case e.g. after a vehicle like a truck has transported the logistics container, to which an asset tracking device according to the present invention is attached, from logistic center A to logistic center B but not e.g. if the container has been transported by a fork lifter from building C to D.

It should be noted that in the context of the present invention, the terms "transmitter" and "transmitting" shall be understood to comprise at least a "sender" and "sending signals", respectively. However, these terms may also comprises transceivers which can transmit/send and receive signals and/or information. Furthermore, it shall be understood hereinafter that "transmitting" means to transmit a signal/information to a an entity external of the asset tracking device.

Furthermore, it should be understood that the configuration of the controller for determining whether the asset tracking device is transported by a predetermined type of transportation means, means that the controller can detect this during or after its corresponding analysis of the acceleration data.

The term "controller" shall comprise microcontrollers/microcontroller units, which are typically understood as a small computer on an integrated circuit. In modern terminology, it is similar to, but less sophisticated than, a system on a chip (SoC); an SoC may include a microcontroller as one of its components. A microcontroller may contain one or more CPUs as processor cores along with memory and programmable input/output peripherals. Program memory in the form of ferroelectric RAM, NOR flash or OTP ROM is also often included on chip, as well as a small amount of RAM.

The asset tracking device presented here is judging the validity of the motion itself and hence is very different from known trackers, which simply transmit at a predefined time-interval or simply decide if an acceleration sensor shows "motion or no motion" as a trigger to send a message. The asset tracking device presented herein does not need to and preferably does not even know its own position, since the inventors of the present invention found the advantage of strictly separating the communication timing, which is handled by the self-sufficient device, and the geo-localization, which may preferably be done in the cloud. The inventors of the present invention found that it is preferable to not only compare and judge driving speed or driving direction to identify deviations from the "what is expected by the server" in order to change the frequency of GPS location updates in situations where hijacking or theft of the vehicle seems possible as described in prior art.

In contrast thereto the present invention teaches to determine whether the pre-defined type of transportation means, which is currently transporting the asset tracking device and the corresponding asset, to which the tracking device is attached, is of the type or kind of transportation means, which indicates a "valid relocation" for the user. This is purely done based on the data the acceleration sensor in the asset tracking device is measuring. Thus, the device of the present invention does not need to know its own position, as will be explained in more detail hereinafter in the context of several embodiments of the present invention.

In other words, the asset tracking device described herein makes a judgement if the motion of the tracker is being judged as a valid relocation of the asset or not. It judges over e.g. motion patterns if the motion profile of the measured acceleration data of the "means of transport" that can be derived from the measured acceleration data qualifies the relocation definition of the user. Typically long-range assets travel over many kilometers from one factory to another factory or from one logistics warehouse to another one. However, customers of the Applicant want to understand where their assets, i.e. trolleys, boxes, load carriers, are located so that they can control their flow and make sure that always a sufficient quantity of assets are available where they are needed. However, any communication, which does not provide any value with new location information e.g. if not an actual relocation takes place generates costs for the customer for the connectivity of the e.g. low-power wide-area (LPWA) network and reduces the lifetime of the device due to current consumption from the battery. So an effective qualification of the means of transport contributes essentially to reduce the size/capacitance/cost of the battery hence contributes to allow the installation of large quantities of trackers to non-powered assets.

For this reason, the inventors of the present invention found that it is not preferable to receive updated location information when the assets are being moved by e.g. hand within the same logistics center, from one side of the hall to another but some customers consider the trip by forklifter from one factory hall to another to be a valid asset relocation, and others don't. The inventors found that it is important for the tracker to understand if it is being moved by e.g. hand or by e.g. a forklifter, by electrical train or dolly, by truck or any other means of transport because the user of the present invention can then advantageously define what they consider a valid relocation. Motion pattern may thus be stored on the asset tracking device, which the controller may then use for a comparison with the measured acceleration data. In an embodiment, the characteristics of these different means of transport such as e.g. the vehicle's suspension resonance frequencies, driving vectors and speeds and the vehicle-related driving distances can be s stored on the device, as will be described in more detail hereinafter.

According to an exemplary embodiment, the judgement if a trip is a valid relocation does not trigger a location update message. According to an exemplary embodiment, it may simply inform to the cloud that a valid relocation has started. In a further preferred embodiment, this message is not communicated during driving but when the vehicle will stop.

In an embodiment, the tracking device may not use any GPS receiver to obtain location, driving speed or direction. All judgements concerning the validity of a relocation may be based on the measurement data from a simple 3-axes accelerometer used in the asset tracking device.

The signal sent out by the transmitter that a transport of the asset tracking device with the predetermined type of transportation means has started may have different formats. In any case, it indicates to the recipient that the controller has identified that the pre-defined, i.e. pre-programmed type/kind of transportation means, has started to transport the asset and the tracker attached thereto. In a preferred embodiment, this signal is only sent out by the tracker at the next stop of the current transport. As will be described in detail hereinafter, a preferable way of transmitting this signal is using Sigfox.

As has become clear from the previous description, the present invention is different from passive RFID-tags and is also different from vehicle tracing.

In a preferred embodiment, the "predetermined type of transportation means" may be selected from the group comprising manual transportation by a user (i.e. hands), a fork lifter, by train, preferably an electrical train, a dolly, a truck, a car, a bike, drone, or any other means typically understood by the skilled reader as transportation mean to transport an asset like a container, a load carrier, or a box.

The present invention beneficially allows overcoming the extremely high level of investments needed for a large volume of asset tracking tasks by closing the chain on each aspect of the total cost of ownership. The asset tracking device may be embodied as "disappearable device", which describes an asset tracker reducing the overall cost of infrastructure investment and operating cost to a minimum by reducing the local infrastructure down to a low-cost tracking device without any pairing to end-user devices, gateways directly communicating to base stations, which might be up to 100 km away from the device or even on a satellite. Such a "disappearable device" may focus on a smart middleware to reduce sensing and device communication to an absolute minimum. The "disappearable device" may use long-range communication to a global low-throughput network e.g. Sigfox, with one unique ID to register in this network when integrating/assembling the device with the asset without any active monitoring of the device itself. This will be described in more detail hereinafter. Hence, the device can be configured to "disappear" from its user who does not need to take care for it which makes the device become abandoned allowing large quantities of devices being administrated.

Thus, in an embodiment the device is configured as a "disappearable asset tracking device" extending the lifetime by the use of a low throughput network in combination with motion pattern recognition.

According to an exemplary embodiment, the signal transmitted by the transmitter is indicative of when the current transport with the predetermined type of transportation means has started. In a preferred embodiment, only this information is contained in the signal.

According to another exemplary embodiment, the acceleration sensor is configured for carrying out a 3-axes acceleration sensing, wherein the controller is configured to determine solely on the basis of 3-axes sensing data of the acceleration sensor whether the asset tracking device is transported by the predetermined type of transportation means.

In other words, the acceleration data generated by this sensor comprise for each data point an X-, Y- and Z-value, for the three space coordinates X, Y and Z. In other words, an enhanced dynamic signal processing algorithm based merely on simple 3-axes acceleration sensing (to reduce the hardware cost of the device) is presented. This can be embedded in a state machine taking care for the main features of a logistic process.

The inventors have surprisingly found that only by using the 3-axes sensing data of the acceleration sensor makes it possible to identify whether the asset tracking device is currently transported by the predetermined type of transportation means. This provides a beneficial solution since 3-axes acceleration sensors are relatively cheap and have a long lifetime and high reliability. As will be explained in more detail in the context of another embodiment, the inventors found novel calculation methods using the data of such a 3-axes acceleration sensor.

Sensor information should allow the conclusion to the full translational acceleration state of at least one point of the device to be monitored. The 3-dimensional acceleration sensor may provide a burst sampling mode for low power consumption but high frequency resolution capability for this type of application.

According to another exemplary embodiment, the acceleration sensor or the controller is configured for counting a change of sign of the sensed acceleration along all 3 axes during a predetermined amount of time, wherein the controller is configured for determining from the counted changes of sign of the sensed acceleration along all 3 axes measured by the acceleration sensor whether the asset tracking device is transported by the predetermined type of transportation means.

Counting or detecting the change of sign (COS) of an acceleration measured by the acceleration sensor can be understood as a pseudo frequency detection. Instead of doing a complex and energy consuming Fast Fourier Transformation (FFT), the inventors of the present invention have found that by counting the change of sign (from positive to negative and vice versa) of the sensed acceleration along some or all 3 axes during a predetermined amount of time, a very reliable data set is achieved, with which the type of transportation means can be identified within the tracker. Thus, this allows deciding by the controller in the tracker whether the predetermined type of transportation means is currently transporting the tracker (and the asset to which it is attached) or not. Comparison data, like e.g. motion patterns or acceleration data being characteristic for a kind of transportation means may be stored on the tracker with which the tracker may compare said dataset. A comparison between the actually measured acceleration data and said motion patterns or said stored acceleration data being characteristic for a kind of transportation means may then be carried out by the controller for identifying, which kind/type of transportation means is currently used for this individual tracker and the corresponding asset. This will be explained in more detail in the context of a detailed embodiment hereinafter.

According to another exemplary embodiment, the asset tracking device further comprises a storage unit on which at least characteristics of the predetermined type of transportation means are stored, Moreover, the controller is configured for comparing the data measured by the acceleration sensor with the stored characteristics of the predetermined type of transportation means thereby determining whether the asset tracking device is transported by a predetermined type of transportation means.

The characteristics may be understood as one or more motion patterns that are stored on the asset tracking device, which the controller may then use for a comparison with the measured acceleration data. In other words, acceleration data being characteristic for a kind of transportation means, like e.g. a truck or a fork lifter, are stored within the tracker, such that the tracker can do the determination of the kind of transportation means without any further data or energy access to the outside of the tracker or to any other device or network.

According to another exemplary embodiment, the characteristics of the predetermined type of transportation means comprise at least one of a measure/parameter characteristic for suspension resonance frequency of the predetermined type of transportation means, driving vectors of the predetermined type of transportation means, a typical speed of predetermined type of transportation means, a typical driving distance of the predetermined type of transportation means.

It should be noted that COS is a simplified method to determine a frequency, which is roughly representative for the vehicle suspension but not exactly the suspension resonance frequency.

The tracker thus can determine based on the comparison of the measured acceleration data and the characteristics of the predetermined type of transportation means, whether the pre-determined means of transportation, e.g. a truck is currently transporting the asset and the tracker attached thereto, or whether only a transportation by a fork lifter is currently ongoing. In an exemplary scenario, the controller is programmed by the user such that only a transportation with a truck is considered as a transportation with the predetermined type of transportation means, and hence an identified transportation with a fork lifter would not result in considering this as a valid relocation. Thus, only in the case of a "truck transport" detection the transmitter is caused to send the signal that a valid relocation has begun.

For this reason, the inventors found that it is important for the tracker to understand if it is being moved by e.g. hand or by e.g. a fork lifter, by electrical train or dolly, by truck or any other means of transport because the user of the present invention can then advantageously define what they consider a valid relocation. Motion pattern may thus be stored on the asset tracking device, which the controller may then use for a comparison with the measured acceleration data.

According to another exemplary embodiment, the controller is configured for allowing a transmission of signal from the emitter only when the controller determined from the data measured by the acceleration sensor that the asset tracking device is transported by the predetermined type of transportation means.

Any communication of the tracker, which does not provide any value (not a valid relocation takes place) generates costs for the user for the connectivity of the used network, e.g. a LPWA network, and reduces the lifetime of the device due to current consumption from the battery. Hence, this embodiment ensures that only for the single decisive criterion, namely whether the predetermined type of transportation means is currently used, a transmission of the transmitter is started/allowed. Otherwise, the tracker suppresses or simply does not cause any other signal transmission. One of the beneficial results of the presented embodiment is a maximum of device lifetime based on its energy capacity due to a minimum of messages transmitted/communicated only if the asset has clearly been relocated.

According to another exemplary embodiment, the asset tracking device does not have any GPS-functionality or any gyroscope-functionality to support the determination of the means of transport.

The inventors of the present invention found that it is preferable to not compare and judge driving speed or driving direction to identify deviations from the "what is expected by the server" in order to change the frequency of GPS location updates in situations where hijacking or theft of the vehicle seems possible as described in prior art. In contrast thereto the present invention teaches to determine whether the pre-defined type of transportation means, which is currently transporting the asset tracking device and the corresponding asset, to which the tracking device is attached, is of the type or kind of transportation means, which indicates a "valid relocation" for the user.

According to another exemplary embodiment, the asset tracking device does not require any GPS-functionality or any gyroscope-functionality to determine the means of transport or any of its analytical components such as driving speed, driving distance or motion patterns.

According to another exemplary embodiment, wherein the signal that a transport of the asset tracking device with the predetermined type of transportation means has started does not comprise a new geographical position. Moreover, the controller is configured to not instantly. i.e. upon said determination, cause the transmitter to transmit said signal, but is configured to cause the transmitter to transmit said signal only when a next stop of a current movement of the asset tracking is detected.

In other words, the presented tracker waits with the signal transmission until the next stop of the current transport is detected. Only then the signal is sent out. A threshold may be used defining a minimum of time during such a stop.

According to another exemplary embodiment, the controller is configured for additionally analyzing the data measured by the acceleration sensor for determining whether a predetermined minimum movement requirement is met. Therein the predetermined minimum movement requirement at least requires that the asset tracking device has been moved from an initial location by at least a predetermined minimum distance and requires that a velocity, with which the asset tracking device has been moved since leaving the initial location, has exceeded a predetermined minimum velocity, which is typical for the predetermined means of transport. Moreover, the controller is configured for causing the transmitter to transmit data representative of a new geographical position of the asset tracking device only when the predetermined minimum movement requirement is met.

The predetermined minimum movement requirement is indicative of a substantial or significant relocation of the asset tracking device, and thus of the corresponding asset, such that the asset tracking device of this embodiment can use this additional condition to discriminate between non-relevant local location changes, e.g. little location changes within one and the same logistic center, or warehouse or production hall etc. and a location change that fulfills the conditions and is thus a "valid relocation" for this embodiment. If desired also the new location data may be sent in this embodiment.

The "predetermined minimum movement requirement" as described herein may be embodied in various different ways depending on the application for which the presented embodiment is used. Such parameters can for example be hardcoded in a state machine of the controller or can be polled by the asset tracking device from a network to receive updated parameters by e.g. downlink. Of course, also other implementations are possible.

One of the beneficial results of the presented embodiment is a maximum of device lifetime based on its energy capacity due to a minimum of messages transmitted/communicated only if the asset has clearly been relocated. In one embodiment, if the asset has not changed its location, only a sign-of-life message can be reported in a defined interval e.g. once per day or once per month.

The "predetermined minimum velocity" may be understood as a velocity value that is stored preferably within the device, e.g. in the controller or in a storage unit, but may also be stored somewhere externally of the device. The same holds true for the "predetermined minimum distance".

Furthermore, the asset tracking device may comprise smart middleware monitoring the status of the device on a continuous but extremely energy-saving basis, as will be explained in more detail hereinafter. It may also only report to the network when there is "something" to report in the sense that the predetermined minimum movement requirement is met. In a particular embodiment the additional requirement must be fulfilled that not only the beginning of a "valid relocation" is determined by the controller (based on the predetermined minimum movement requirement) but also that the new location is reached by the asset and thus also by the asset tracking device. In other words, the additional requirement must be fulfilled that the detected/determined "valid relocation" is completed. In this embodiment the new location data describing the new geoposition of the asset and the corresponding asset tracking device is only transmitted by the transmitter if both requirements, as explained hereinbefore, are met. It should be noted that the term "geoposition" is used herein synonymously and interchangeably with the term "geographical position".

Assets in the land, air, and sea logistics as well as in production logistics have different phases of motion and stand-still or halt. In order to allow the device to reduce sensing and communication to an absolute minimum the device preferably understands in which phase it is in but with a minimum of sensing and processing effort and preferably by getting rid of expensive absolute position sensors such as GPS and others. This will be explained hereinafter in more detail in the context of particular embodiments. Typically handling of these assets include manual operation and sorting, moving by trolleys and containers, conveyor belts, electrical lifters or movers, fork lifters, factory trains, pneumatic delivery, bi- and tricycles, motorcycles, electrical or combustion engine-driven vehicles with two or more axles, vessels, aircraft, helicopters, drones and many more.

Other parameters, which describe particular embodiments of the present invention, may include base floor noise and threshold levels for each phase of the handling and minimum/maximum durations of asset travel and standstill.

As is understood by the skilled reader, the more reduced the sensing to safe battery life is, the more inaccurate the estimation of handling speed and relocation distance due to other influences on the sensing such as rough roads, cornering forces, vibration of means of transport etc.

According to an embodiment, no communication signaling or other means of additional radio operation adds to the power consumption of the device. The device though it may continuously monitor the status and motion of the asset is reducing the required capacity of energy in addition by not reporting any tracing during the asset is moving but saving the current consumption down to reporting the location only when clearly a location change has been completed. This allows overcoming one fundamental roadblock of today's solutions, battery consumption for fixed interval-configured messages when there is nothing new to report.

On top of this optionally sensor data such as temperature, geo-magnetic orientation, humidity, light intensity, current consumption, start time of relocation, switch push/release events, antitampering alarms, drop-detections, battery status, acceleration, magnetic flux, sound signals, pressure and other signals can be transmitted.

According to an exemplary embodiment of the present invention the predetermined minimum distance is 1 km, 2 km, or 5 km, and the predetermined minimum velocity is 20 km/h, 40 km/h or 50 km/h.

These values are particularly suitable when the presented asset tracking device is used in the context of logistic services, in which objects are transported by vehicles like e.g. trolleys from location A to B. An example is the transportation of logistics objects with containers and trolleys.

According to an exemplary embodiment of the present invention the controller is configured to switch into a halt sensing mode upon determining that the asset tracking device is transported by the predetermined type of transportation means. Further, the controller is configured to detect in the halt sensing mode whether a halt of the asset tracking device is measured by the acceleration sensor for more than a predetermined amount of time.

For this embodiment, the term "upon determining that the asset tracking device is transported by the predetermined type of transportation means" shall be understood such that the controller switches into this halt sensing mode when it was previously determined by the controller that said requirement is met. The "predetermined amount of time" may be threshold value like x minutes, x hours, or x days.

In a preferred embodiment, the device is configured to use a reduced sampling rate in the halt sensing mode.

According to an exemplary embodiment of the present invention, the controller is configured for causing the transmitter to transmit data representative of the new geographical position of the asset tracking device only when additionally the controller has detected a halt of the asset tracking device that exceeded the predetermined amount of time.

It shall be understood that the detected halt exceeding the predetermined amount of time shall preferably occur after it was determined by the controller that a transport of the asset tracking device with the predetermined type of transportation means has started.

In other words, in this embodiment the additional requirement must be fulfilled that not only the beginning of a "valid relocation" is determined by the controller (based on the determination that the asset tracking device is currently transported by the predetermined type of transportation means) but also that the new location is reached by the asset and thus also by the asset tracking device. In other words, the additional requirement must be fulfilled that the detected/determined "valid relocation" is completed. In this embodiment the new location data describing the new geoposition of the asset and the corresponding asset tracking device is only transmitted by the transmitter if both requirements, as explained hereinbefore, are met. The new location data describing the new geoposition may be e.g. WiFi addresses received by the activated WiFi module, as will be explained in more detail hereinafter in the context of particular embodiments.

According to an exemplary embodiment of the present invention, the device is configured for pre-processing the data measured by the acceleration sensor before the data are analyzed by the controller. The pre-processing of the data measured by the acceleration sensor comprises compensating and/or removing at least some movements detected by the acceleration sensor, which are not caused by a container or trolley.

Parts of the measured data of the acceleration sensor with accelerations and/or frequencies can be removed, which are not characteristic and/or indicative for a typical asset/container or trolley movement. For example, electrical lifters or movers, fork lifters, bi- and tricycles, cause entirely different accelerations and/or vibrations to an asset and an asset tracking device. The data received from the accelerating sensor may be filtered such that these components not originating from a container or trolley transport desired to be detected by the individual user are removed from the data or are compensated for. In this context, the controller may compare the measured data with stored motion patters and may decide whether the data analyzed is indicative for being caused by a container or trolley movement.

According to an exemplary embodiment of the present invention pre-processing the data measured by the acceleration sensor further comprises at least one of filtering the data with respect to impulsion or brake force of a vehicle with which the asset tracking device is moving, filtering the data with respect to forces caused by road irregularities, and filtering the data with respect to the Gravitational Force.

In this way, e.g. an acceleration of gravity directed to the center of the earth can be subtracted, e.g. on a vector level, from the measured acceleration data. Furthermore, road irregularities like e.g. road bumps or gravel on a gravel road do cause characteristic signals in an acceleration sensors. If this is detected by the controller, such data are removed or the data are amended accordingly in the sense of a compensating for such undesired effects.

According to an exemplary embodiment of the present invention, the transmitter is configured to transmit the signal that a transport of the asset tracking device with the predetermined type of transportation means has started to an external device by radio frequency communication in a low-power wide-area network (LPWAN), in particular Sigfox.

A low-power wide-area network (LPWAN) or low-power wide-area (LPWA) network or low-power network (LPN) is a type of wireless telecommunication wide area network designed to allow long range communications at a low bit rate among things (connected objects), such as sensors operated on a battery also sometimes described as examples of "low throughput networks". This is known to the person skilled in the art. The low power, low bit rate and intended use distinguish this type of network from a wireless WAN that is designed to connect users or businesses, and carry more data, using more power. The LPWAN data rate may range from 0.1 kbit/s to 50 kbit/s per channel. A LPWAN may be used to create a private wireless sensor network, but may also be a service or infrastructure offered by a third party, allowing the owners of devices to deploy them in the field without investing in gateway technology.

In an embodiment, the transmitter uses ultra-narrow band (UNB), modulation technology used for LPWAN. This is used by various companies including Sigfox, which is a UNB-based technology. Sigfox typically offers 100 bps, in special cases 600 bps. Other ultra-narrow band technologies are offered by Telensa, Nwave, Weightless, and NB-Fi Protocol.

In a preferred embodiment, the device is registered in the network with a unique identifier. In another embodiment, the transmitter is configured to transmit at 868 MHz and/or at 902 MHz. The selection of the frequency may depend on the global region's radio certification standards.

According to an exemplary embodiment of the present invention, the device further comprises a WiFi module for receiving addresses of WiFi hotspots surrounding the asset tracking device. The controller is configured for causing the transmitter to transmit the received WiFi addresses as the data representative of the new geographical position of the asset tracking device.

After the detected "valid relocation" based on the determination by the controller that a transport of the asset tracking device with the predetermined type of transportation means has started and after it was found to be clearly finished, the device is configured to "sniff" for WiFi Hotspots whose addresses are being communicated on e.g. the Sigfox communication channel for further geolocation based on the transmitted WiFi addresses in the cloud. Thus, by using WiFi addresses for determining the geolocation of the asset tracking device one beneficially gets rid of or avoids expensive absolute position sensors such as GPS and others.

According to an exemplary embodiment of the present invention, the controller is configured for activating the WiFi module upon detection that a halt of the asset tracking device is measured by the acceleration sensor for more than a predetermined amount of time.

In other words, generally, the WiFi module is switched off and only in case the completion of a "valid relocation" is determined/detected by the controller the WiFi module is activated. This also saves energy and allows for the provision of a highly energy- and communication-efficient device. No connection to a WiFi network and no WiFi communication takes place in order to reduce the power consumption even more.

On the device side typically the short-range pairing effort to end-user devices/gateways provide an uneconomical effort for extremely high volumes of assets, continuous motion sensing and real-time data communication prohibit the use of affordable and small-integration size of energy sources. This problem of the prior art is avoided by this embodiment of the present invention. Thus, this asset tracking device reduces the overall costs of infrastructure investment and operating costs to a minimum by reducing the local infrastructure down to a low-cost tracking device without any pairing to end-user devices, gateways or base stations and focusing on a smart middleware to reduce sensing and device communication to an absolute minimum.

According to an exemplary embodiment of the present invention, the device is configured to switch off the transmitter unless the transmitter is caused by the controller to transmit the signal that a transport of the asset tracking device with the predetermined type of transportation means has started.

In this way, another benefit in realizing a very low energy consuming asset tracking device can be realized.

According to an exemplary embodiment of the present invention, the acceleration sensor is configured for sensing acceleration data with a sampling period, which is slower than 250 ms, slower than 500 ms or slower than 1000 ms.

According to an exemplary embodiment of the present invention, the controller is configured to cause the transmitter to transmit a sign of life message in case the determination whether a transport by a predetermined type of transportation means has started did not occur within a predefined time interval, preferably within one day, and more preferably within one month.

According to another aspect of the present invention an asset, to which an asset tracking device is attached according to any of the aspects and embodiments mentioned herein, is presented. The asset preferably is a container or a load carrier or a box or a trolley.

According to another aspect of the present invention, a method of determining whether an asset tracking device is transported by a predetermined type of transportation means is presented. The method comprises the steps of measuring an acceleration experienced by the asset tracking device by an acceleration sensor of the asset tracking device (S1), analyzing by a controller of the asset tracking device data measured by the acceleration sensor thereby determining whether the asset tracking device is transported by a predetermined type of transportation means whether a predetermined minimum movement requirement is met (S2), and transmitting by a transmitter of the asset tracking device a signal that the transport of the asset tracking device with the predetermined type of transportation means has started, when the controller determined from the data measured by the acceleration sensor that the asset tracking device is transported by the predetermined type of transportation means (S3).

This method can be implemented and carried out by e.g. the asset tracking device according to the present invention as has been described hereinbefore in detail. Furthermore, a processor or computer may be instructed accordingly, as will be explained hereinafter.

According to another aspect of the present invention, a program element for determining whether an asset tracking device is transported by a predetermined type of transportation means is presented. The program element, when being executed by a processor, is adapted to carry out:

receiving data of an acceleration sensor of the asset tracking device, which measured an acceleration experienced by the asset tracking device, analyzing the received data measured by the acceleration sensor thereby determining whether the asset tracking device is transported by a predetermined type of transportation means, and generating a control signal for causing a transmitter of the asset tracking device to transmit a signal that the transport of the asset tracking device with the predetermined type of transportation means has started, when it was determined from the data measured by the acceleration sensor that the asset tracking device is transported by the predetermined type of transportation means.

According to another aspect of the present invention a computer-readable medium is presented, on which a computer program according to the previous aspect is stored.

The computer program element may be part of a computer program, but it can also be an entire program by itself. For example, the computer program element may be used to update an already existing computer program to get to the present invention.

The computer readable medium may be seen as a storage medium, such as for example, a USB stick, a CD, a DVD, a data storage device, a hard disk, or any other medium on which a program element as described above can be stored.

DESCRIPTION OF THE PREFERRED EMBODIMENTS

Figure 1:
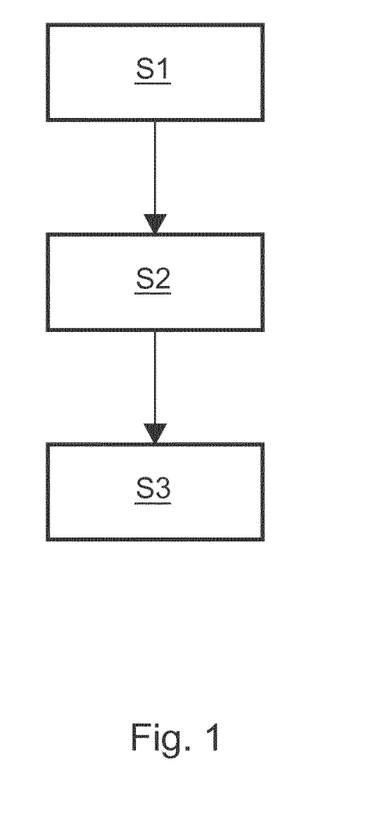
FIG. 1 schematically shows a flow diagram of a method according to an exemplary embodiment of the present invention.

FIG. 1 schematically shows a flow diagram a method of determining whether an asset tracking device is transported by a predetermined type of transportation means. This method can be implemented and carried out by e.g. the asset tracking device according to the present invention as has been described hereinbefore in detail. The method shown in FIG. 1 comprises the steps of measuring an acceleration experienced by the asset tracking device by an acceleration sensor of the asset tracking device (S1). Moreover, in step S2 a controller of the asset tracking device analyzes the data measured by the acceleration sensor thereby determining whether the asset tracking device is transported by a predetermined type of transportation means. Further, transmitting by a transmitter of the asset tracking device a signal that the transport of the asset tracking device with the predetermined type of transportation means has started, when the controller determined from the data measured by the acceleration sensor that the asset tracking device is transported by the predetermined type of transportation means is carried out in step S3.

One of the beneficial results of this method is a maximum of device lifetime based on its energy capacity due to a minimum of signals transmitted/communicated only if the asset has clearly been relocated by the predetermined type of transportation means. In one embodiment, if the asset has not been relocated by the predetermined type of transportation means, only a sign-of-life message can be reported in a defined interval e.g. once per day or once per month.

The method described in the context of FIG. 1 can be combined with all the aspects and embodiments of the invention explained hereinbefore in detail, unless explicitly stated otherwise. In particular, this method together with the low-throughput communication such as Sigfox allows to operate a device for up to ten years lifetime with only one A-sized battery cell with an average of three relocations per day. So there is no longer any need for administrating the battery lifetime (access to the device, pairing with other devices, charging or battery replacement processes and infrastructure) or local data receiving infrastructure etc. allowing an asset management solution which is low-cost allowing the user to incorporate it in high quantities.

Figure 2:
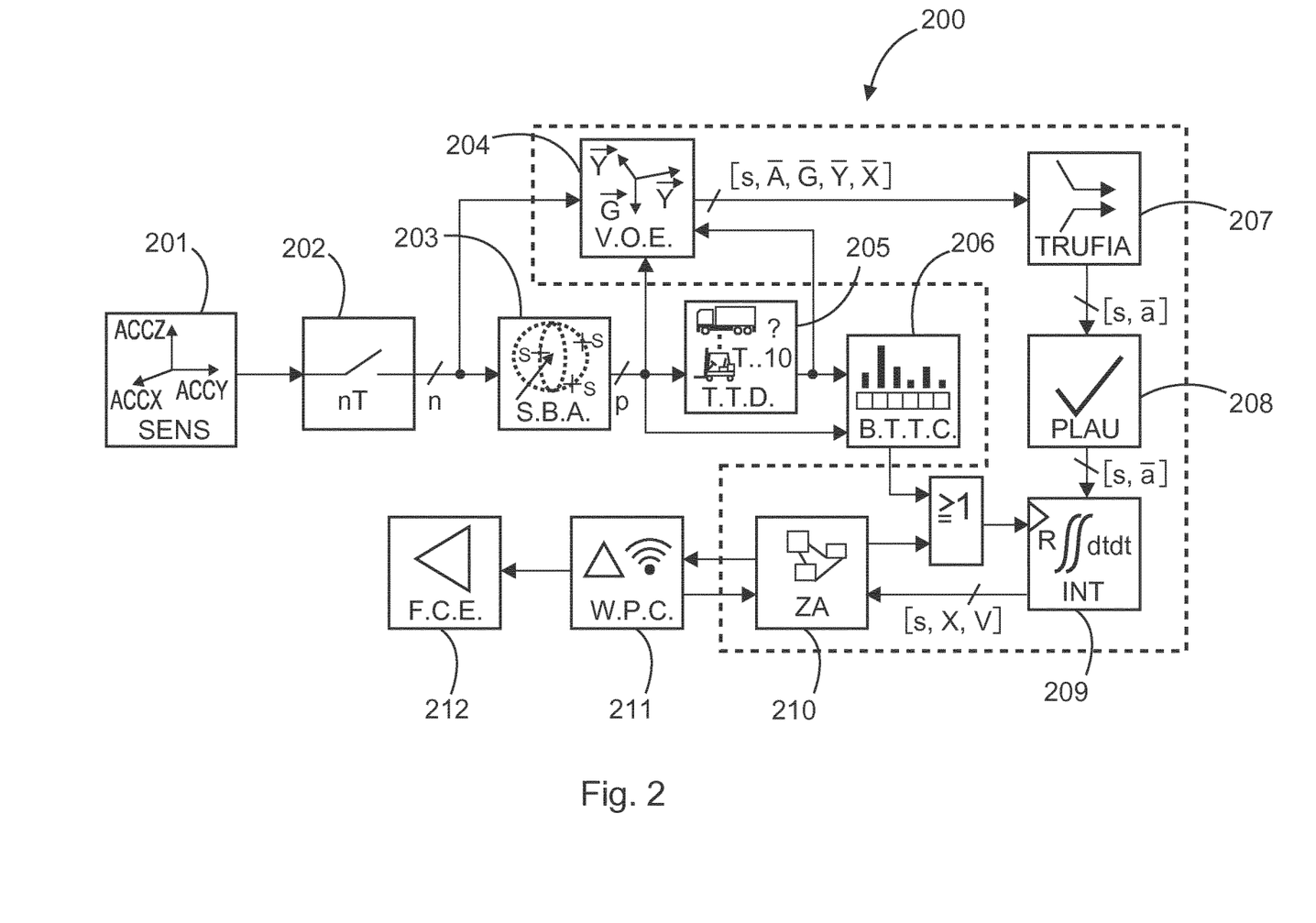
FIG. 2 schematically shows a detailed description of motion algorithm comprising a determination whether an asset tracking device is transported by a predetermined type of transportation means that is carried out in an asset tracking device according to an exemplary embodiment of the present invention.
Figure 3:
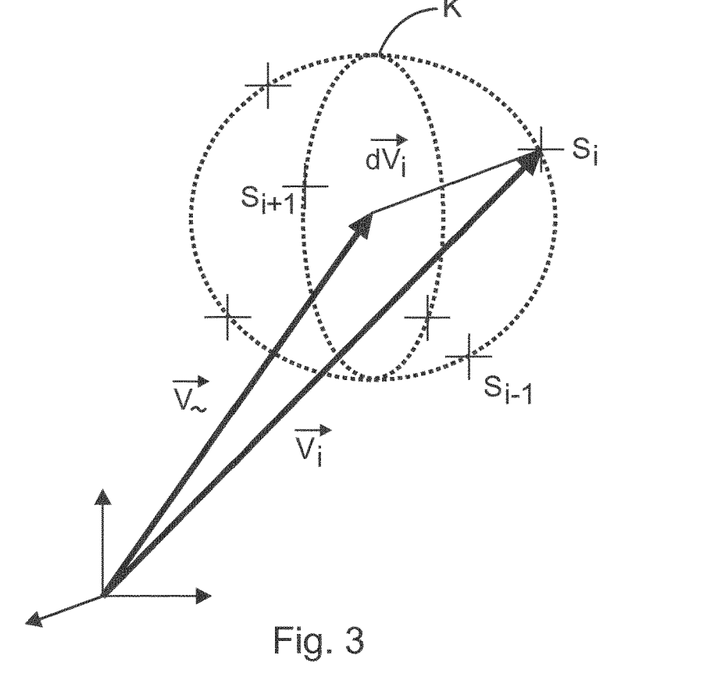
FIG. 3 schematically shows a point cloud around the average vector V that can be used for calculations in embodiments of the present invention.
Figure 4:
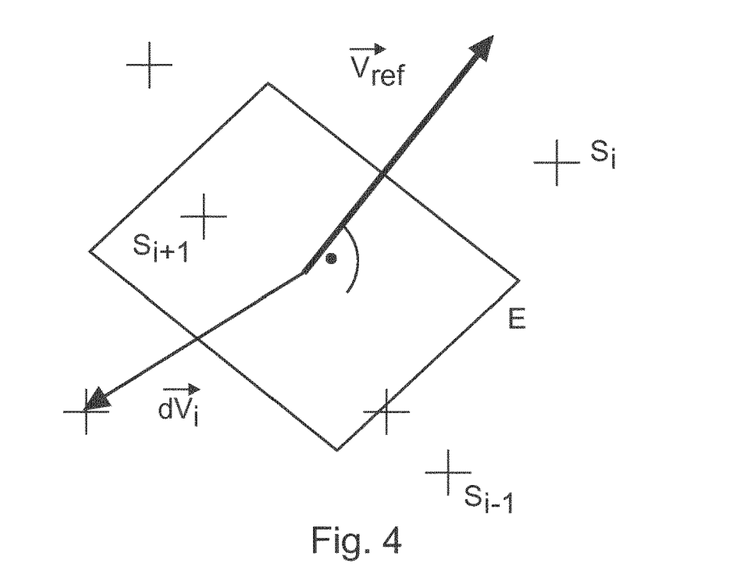
FIG. 4 schematically shows a reference vector for direction selective frequency and amplitude acquisition that can be used for calculations in embodiments of the present invention.

FIG. 2 schematically shows the working principle of an asset tracking device according to an exemplary embodiment of the present invention. A detailed description of a motion algorithm 200 used in said asset tracking device is shown in FIG. 2, which comprises many additional and optional features as compared to the present invention described in FIG. 1. Thus, a detailed example of operational blocks and their interaction to realize a judgement about the validity of relocation according to any exemplary embodiment of the present invention is provided. A 3-dimensional acceleration sensor 201 is shown. Sensor information should allow the conclusion to the full translational acceleration state of at least one point of the device to be monitored. This operational block is represented by a three dimensional acceleration sensor, which provides a burst sampling mode for low power consumption but high frequency resolution capability for this type of application. Moreover, a burst data acquisition is shown in block 202 in FIG. 2. The signal processing unit samples and stores the samples of a burst of n data points generated every period of time T. Thus, an n-dimensional vector array is provided for further analysis by this block. Further, a Sample Burst Analysis Algorithm (S.B.A) is used in block 203. The sample burst analyses algorithm transfers a burst of sample data into a set of scalar properties, which characterizes the burst in a similar way like the frequency domain's parameters frequency and amplitude would do. It is in this context referred to FIG. 3, which shows a point cloud around the average vector V, which points by definition into the center of the point cloud—here sketched as a sphere K. The sample points $S_i$ with i being an element from [0 . . . . Burstlength] define a trace through the point cloud—the way of the superposed oscillations. Using the vector calculus allows by calculation of the differential vector $dV_i = V_i - V$ to define a direction to each sample point $S_1$ via its vector $V_i$. If we choose now a direction defined by the vector $V_{ref}$ as shown in FIG. 4 for detecting a change of sign (CoS) of the signal trace. The CoS is a value close to the frequency of the oscillation, which parametrizes this oscillation into the direction observed. If no special direction is known, $V_{ref}$ should be defined by the longest vector from the set of vectors $dV_i$ for achieving the highest frequency sensitivity.

Properties of the directional defined oscillations, which can be analysed by these methods are:
CoS: Change of Signs of the signals (pseudo frequency)
PP: maximum Peak-Peak-of the oscillation in the given direction
LoL: Length of Line—how long is the way, the trace of the burst travels
Average vector V: Average of the acceleration's direction FIG. 4 shows an introduction of a reference vector for direction selective frequency and amplitude acquisition. Scalar values like PP or LoL are kept square to avoid square roots to be calculated on the device.

Figure 5:
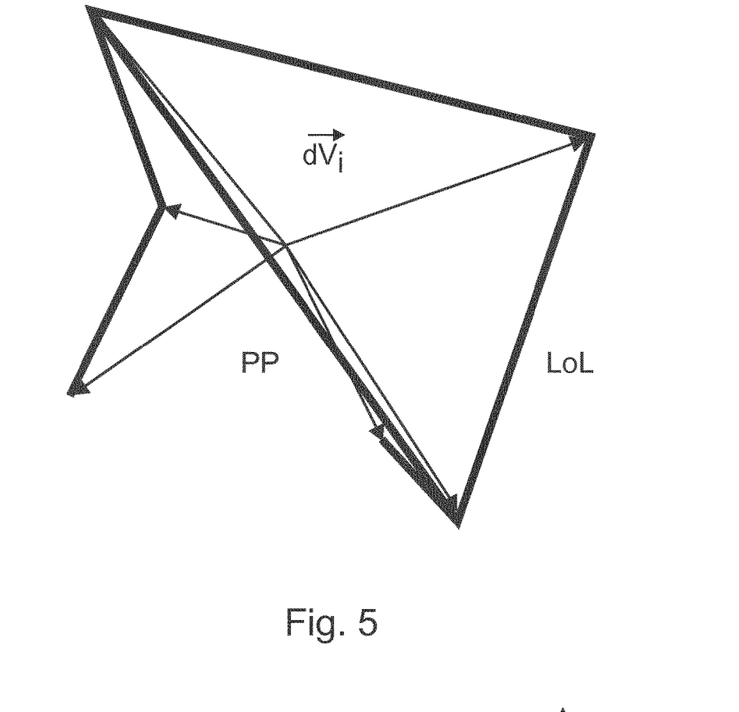
FIG. 5 schematically shows the parameter length of line (LOL) that can be used for calculations in embodiments of the present invention.
Figure 6:
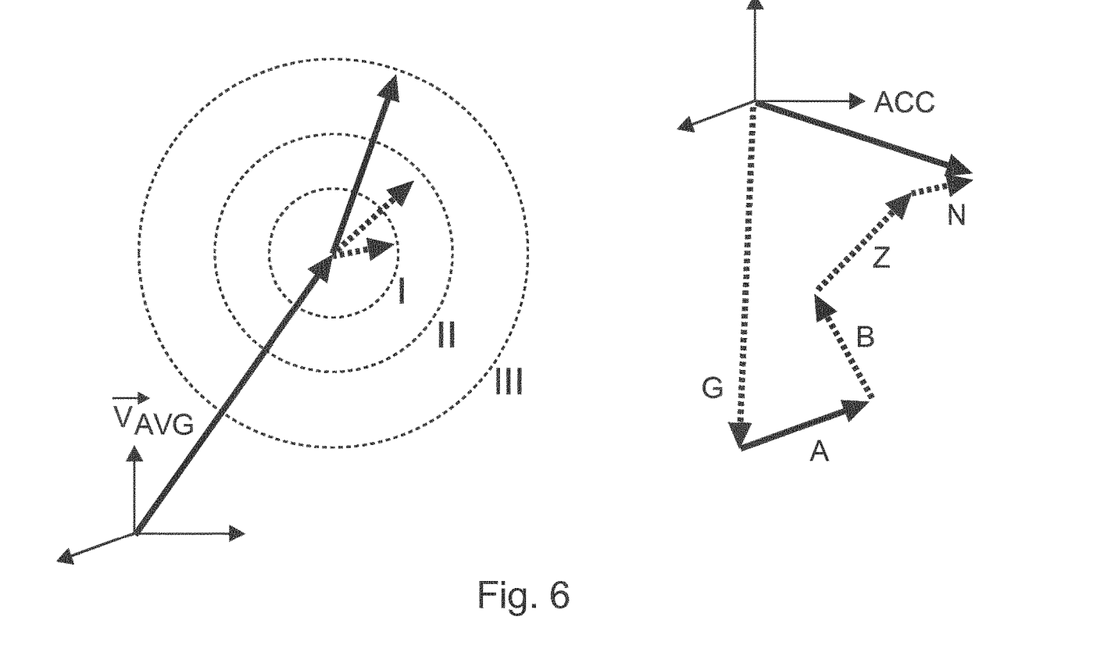
FIG. 6 schematically shows a burst classification that can be used for calculations in embodiments of the present invention.

The motion algorithm of the asset tracking device shown in FIG. 2 further comprises an Vehicle Orientation Estimator (VOE) in block 204. Rest Classification over LoL: Length of Line i.e. the total of the squared length of lines V2V and PP the Peak Peak, i.e. quadratic distance between oscillation peaks. FIG. 5 shows details about said Length of Line. This allows an immediate classification based on rating of LOL and PP with oscillation type information. Bump angles (bump acceleration vector versus gravity) can give a rough information about driving slopes. FIG. 2 also shows a block 205 for Transportation Type Detection, which evaluates the Change of Signs (CoS) of a burst and the Length of a line information. Based on the CoS and LoL information provided by the S.B.A. for each burst of sampled data a clear, fast judgement can be done if the means of transport is a e.g. truck or not. The determination is based on LoL-thresholds for every CoS case—what is comparable to a spectrum defined map of allowed vibration intensity (motion patterns). A not-decisive judgement is being made, if the vibration represented by the burst of samples has a too low or too high vibration excitation (CoS). In this simple case the determination criteria can be formulated with advantage by two points (i.e. CoS and LoL value) per section, which define linear equations separating "'Truck" from "No Truck'" regions by slope parameter m and axis intercept t. Border points define the regions which belong to not-decisive judgement, which are rated by probability in the embodiment of FIG. 2. In a more wider version of the TTD the algorithm does not only differ between "Truck" from "No Truck" but the device is analyzing which means of transport—not only truck—is being used. For this the sample burst analyses is further analyzed and compared against motion patterns stored for each vehicle type in the form of its characteristic set of fingerprints such as COS.

Figure 7:
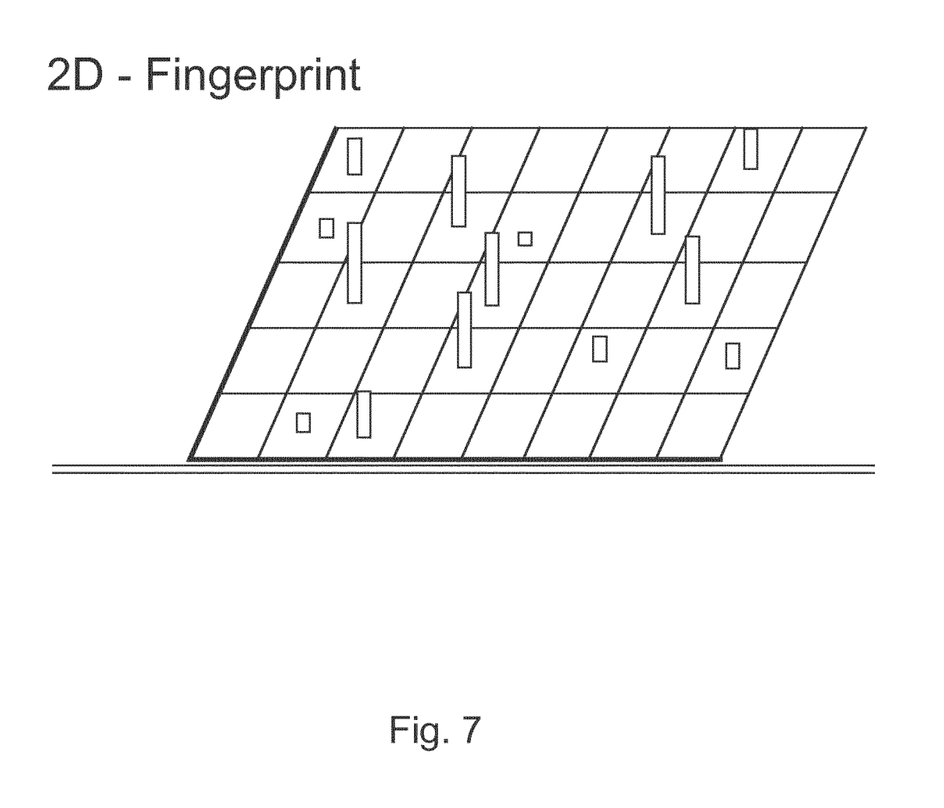
FIG. 7 schematically shows a 2D fingerprint of angle versus change of sign (COS) that can be used for calculations in embodiments of the present invention.

FIG. 7 shows a 2D fingerprint of angle versus COS. Very reliable results show our Monte Carlo Fingerprint approach over 2D fingerprint of angle versus COS, as shown in FIG. 7, which works in two steps. Due to using lookup tables the computing power and memory to store per vehicle type needed to identify the fingerprint is very low.
Step 1:
Calculate Angle and Determine Index of Field in Fingerprint
Get Probability from Fingerprint CoS over Angle
Step 2:
Add Probability to Candidate
Subtract Probability from Competitors The embodiment of FIG. 2 further comprises Bounded Transportation Type Counter 206. The previously described determination procedures can result in not-decisive judgements, if some unusual driving conditions occur—e.g. the vehicle is driving on an unpaved road. The major decision is being made by a probability decision strategy using the Bounded Transportation Type Counter. This algorithm uses a counter for every type to be classified. Not-decisive decisions are being ignored. If a valid transport type classification is available, the respective counter will be incremented. If the sum over all counters is higher than a defined evaluation threshold the other counters are decremented by one if not zero. If a counter reaches a value which is higher than the decision threshold, the transport type decision is still made. If there are more than one counters with a value above the decision threshold, the highest counter is being selected. If the decision threshold is higher than the half of the evaluation threshold, only one counter can be above the decision threshold—what simplifies the code. The decision threshold defines the number of samples a decision can be expected.

The embodiment of FIG. 2 further comprises a filter algorithm shown in block 207.

The filter algorithm cleans the current average acceleration vector from gravity directional accelerations using basic scalar product calculations. If driving direction or centrifugal direction is provided, this operational block can be enhanced to filter out unwanted acceleration directions in an analogue way. Moreover, the embodiment of FIG. 2 further makes use of Plausibility Checks in block 208. This operational block checks if the remaining acceleration is within a plausible range of accelerations to be regarded for integration based on motion patterns for different vehicles. In Integrator 209 an integration in time domain of the acceleration vectors is carried out in this operational block. A reset input allows to set the integration result of velocity and position back to zero. Output of this functional block is the position (distance travelled) and position velocity vectors in their square values. A Task Specific State Machine 210 is comprised as well. The task specific state machine controls the behavior of the self-sufficient device and uses the result of the transport type detection, distance travelled and position velocity to qualify motion as a valid relocation. The task specific state machine also controls and resets the time integrator.

Further, a Final Control Element 212 is comprised. As a final control element typically a radio transmitter is being used to inform the customer about start and finish of a valid relocation.

The invention claimed is:

1. An asset tracking device for determining whether a transport by a predetermined type of transportation means has started, the device comprising
 an acceleration sensor configured to measure an acceleration experienced by the asset tracking device,
 a controller configured to analyze data measured by the acceleration sensor, and
 a transmitter,
 wherein the controller is configured to determine from the data measured by the acceleration sensor whether the asset tracking device is transported by a predetermined type of transportation,
 wherein the controller is configured to cause the transmitter to transmit a signal that a transport of the asset tracking device with the predetermined type of transportation has started, when the controller has determined from the data measured by the acceleration sensor that the asset tracking device is transported by the predetermined type of transportation,
 wherein the acceleration sensor is configured to carry out a 3-axes acceleration sensing,
 wherein the controller is configured on the basis of 3-axes sensing data of the acceleration sensor to determine whether the asset tracking device is transported by the predetermined type of transportation, wherein the acceleration sensor or the controller is configured to count a change of sign of the sensed acceleration along 3 axes during a predetermined amount of time, wherein the controller is configured to determine from the counted changes of sign of the sensed acceleration along 3 axes measured by the acceleration sensor whether the asset tracking device is transported by the predetermined type of transportation, and wherein the asset tracking device is configured to be attached to an asset.

2. The asset tracking device according to claim 1, further comprising
a storage unit on which at least characteristics of the predetermined type of transportation are stored, and
wherein the controller is configured to compare the data measured by the acceleration sensor with the stored characteristics of the predetermined type of transportation thereby determining whether the asset tracking device is transported by a predetermined type of transportation.

3. The asset tracking device according to claim 2, wherein characteristics of the predetermined type of transportation comprise at least one measure representative of a suspension resonance frequency of the predetermined type of transportation, driving vectors of the predetermined type of transportation, a typical speed of the predetermined type of transportation, a typical driving distance of the predetermined type of transportation.

4. The asset tracking device according to claim 1, wherein the controller is configured to allow a transmission of a signal from the transmitter only when the controller has determined from the data measured by the acceleration sensor that the asset tracking device is transported by the predetermined type of transportation.

5. The asset tracking device according to claim 1, wherein the asset tracking device does not require any UPS-functionality or any gyroscope-functionality to determine the predetermined type of transportation or any of its analytical components such as driving speed, driving distance or motion patterns.

6. The asset tracking device according to claim 1, wherein the signal that a transport of the asset tracking device with the predetermined type of transportation has started does not comprise a new geographical position, and
wherein the controller is configured to not instantly upon said determination cause the transmitter to transmit said signal, but is configured to cause the transmitter to transmit said signal only when a next stop of a current movement of the asset tracking is detected.

7. The asset tracking device according to claim 1, wherein the controller is configured to analyze data measured by the acceleration sensor for determining whether a predetermined minimum movement requirement is met,
wherein the predetermined minimum movement requirement at least requires that the asset tracking device has been moved from an initial location by at least a predetermined minimum distance and requires that a velocity, with which the asset tracking device has been moved since leaving the initial location, has exceeded a predetermined minimum velocity, and
wherein the controller is configured to cause the transmitter to transmit data representative of a new geographical position of the asset tracking device only when the predetermined minimum movement requirement is met.

8. The asset tracking device according to claim 1, wherein the controller is configured to switch into a halt sensing mode upon determining that the asset tracking device is transported by the predetermined type of transportation, and
wherein the controller is configured to detect in the halt sensing mode whether a halt of the asset tracking device is measured by the acceleration sensor for more than a predetermined amount of time.

9. The asset tracking device according to claim 1, wherein the device is configured to perform pre-processing of the data measured by the acceleration sensor before the data are analyzed by the controller, and
wherein the pre-processing of the data measured by the acceleration sensor comprises compensating and/or removing parts of the data detected by the acceleration sensor, which are not indicative for being caused by a trolley.

10. The asset tracking device according to claim 9, wherein the pre-processing of the data measured by the acceleration sensor further comprises at least one of filtering the data with respect to impulsion or brake force of a vehicle with which the asset tracking device is moving, filtering the data with respect to forces caused by road irregularities, and filtering the data with respect to the Gravitational Force.

11. The asset tracking device according to claim 1, wherein the transmitter is configured to transmit the signal that a transport of the asset tracking device with the predetermined type of transportation has started to an external device by radio frequency communication in a low-power wide-area network (LPWAN), in particular Sigfox.

12. The asset tracking device according to claim 1, further comprising
a WiFi module configured to receive addresses of WiFi hotspots surrounding the asset tracking device, and
wherein the controller is configured to cause the transmitter to transmit the received WiFi addresses as data representative of a new geographical position of the asset tracking device.

13. An asset, to which the asset tracking device according to claim 1 is attached, wherein the asset is a container or a load carrier or a trolley.

14. A method of determining whether an asset tracking device is transported, when being attached to an asset, by a predetermined type of transportation means, the method comprising the steps of
measuring an acceleration experienced by the asset tracking device by an acceleration sensor of the asset tracking device,
analyzing, by a controller of the asset tracking device, data measured by the acceleration sensor thereby determining whether the asset tracking device is transported by a predetermined type of transportation,
transmitting, by a transmitter of the asset tracking device, a signal that the transport of the asset tracking device with the predetermined type of transportation has started, when the controller has determined from the data measured by the acceleration sensor that the asset tracking device is transported by the predetermined type of transportation,
carrying out a 3-axes acceleration sensing by the acceleration sensor, determining by the controller on the basis of 3-axes sensing data of the acceleration sensor whether the asset tracking device is transported by the predetermined type of transportation, counting a change of sign of the sensed acceleration along 3 axes during a predetermined amount of time by the acceleration sensor or the controller, and determining, by the controller, from the counted changes of sign of the sensed acceleration along 3 axes measured by the acceleration sensor whether the asset tracking device is transported by the predetermined type of transportation.

15. A non-transitory computer-readable recording medium having stored therein a program for determining whether an asset tracking device is transported, when being attached to an asset, by a predetermined type of transportation, the program causing a processor to execute a process comprising:

receiving data of an acceleration sensor of the asset tracking device, which measured an acceleration experienced by the asset tracking device, analyzing the received data measured by the acceleration sensor thereby determining whether the asset tracking device is transported by a predetermined type of transportation, and generating a control signal for causing a transmitter of the asset tracking device to transmit a signal that the transport of the asset tracking device with the predetermined type of transportation has started, when a determination has been made from the data measured by the acceleration sensor that the asset tracking device is transported by the predetermined type of transportation, carrying out a 3-axes acceleration sensing by the acceleration sensor, determining on the basis of 3-axes sensing data of the acceleration sensor whether the asset tracking device is transported by the predetermined type of transportation, counting a change of sign of the sensed acceleration along 3 axes during a predetermined amount of time by the acceleration sensor or a controller, determining, by the controller, from the counted changes of sign of the sensed acceleration along 3 axes measured by the acceleration sensor whether the asset tracking device is transported by the predetermined type of transportation.

* * * * *